US012591998B2

(12) United States Patent (10) Patent No.: US 12,591,998 B2
Kawase et al. (45) Date of Patent: Mar. 31, 2026

(54) OCCUPANT MONITORING DEVICE, OCCUPANT MONITORING METHOD, AND MEDIUM

(71) Applicant: Mitsubishi Electric Corporation, Tokyo (JP)

(72) Inventors: Mizuki Kawase, Tokyo (JP); Taro Kumagai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/835,273

(22) PCT Filed: Mar. 8, 2022

(86) PCT No.: PCT/JP2022/009954
§ 371 (c)(1),
(2) Date: Aug. 1, 2024

(87) PCT Pub. No.: WO2023/170777
PCT Pub. Date: Sep. 14, 2023

(65) Prior Publication Data
US 2025/0182330 A1 Jun. 5, 2025

(51) Int. Cl.
*G06T 7/80* (2017.01)
*G06V 20/59* (2022.01)
*G06V 40/10* (2022.01)

(52) U.S. Cl.
CPC ............... *G06T 7/80* (2017.01); *G06V 20/59* (2022.01); *G06V 40/10* (2022.01); *G06T 2207/30196* (2013.01); *G06T 2207/30268* (2013.01)

(58) Field of Classification Search
CPC ........... H04N 17/002; G06T 7/70; G06T 7/73; G06T 7/75; G06T 7/80;
(Continued)

(56) References Cited

U.S. PATENT DOCUMENTS 7,050,606 B2 * 5/2006 Paul ..................... G06V 10/758
382/104
8,212,878 B2 * 7/2012 Shima ....................... G06T 7/80
382/104
(Continued)

FOREIGN PATENT DOCUMENTS

JP 2005-313843 A 11/2005
JP 2010-181209 A 8/2010

OTHER PUBLICATIONS

International Search Report for PCT/JP2022/009954 (PCT/ISA/210) mailed on May 31, 2022.

*Primary Examiner* — Brian P Yenke
(74) *Attorney, Agent, or Firm* — Birch, Stewart, Kolasch & Birch, LLP

(57) ABSTRACT
An occupant monitoring device includes processing circuitry configured to: acquire a captured image in which an inside of a vehicle is captured by an imaging device provided in a movable component in the vehicle; perform sensing that is at least one of state determination of an occupant or personal authentication of the occupant by image processing of the captured image; estimate whether or not there is a change in a position of the imaging device; perform calibration for the image processing; and not perform the sensing and perform the calibration when the processing circuitry estimates that there is a change in the position of the imaging device.

10 Claims, 7 Drawing Sheets

(58) Field of Classification Search
       CPC .......... G06T 2207/30196; G06T 2207/30268;
                               G06V 20/59; G06V 40/10
       See application file for complete search history.

(56)                      References Cited

U.S. PATENT DOCUMENTS

| | | | |
|---|---|---|---|
| 9,361,687 B2 * | 6/2016 | Shimoda ................... | G06T 7/80 |
| 9,794,552 B1 * | 10/2017 | Ribble ................. | H04N 17/002 |
| 10,846,884 B2 * | 11/2020 | Hayakawa ................ | G06T 7/80 |
| 2016/0282133 A1 * | 9/2016 | Kumagai ................. | B60R 1/28 |
| 2016/0342205 A1 * | 11/2016 | Shigeta ............... | G06V 10/147 |
| 2017/0061622 A1 * | 3/2017 | Sakano .................... | G06T 7/80 |
| 2019/0206084 A1 * | 7/2019 | Noble ................... | G06V 40/19 |
| 2019/0206115 A1 * | 7/2019 | Tytgat .................... | G06T 15/20 |
| 2020/0082568 A1 * | 3/2020 | Hayakawa ............... | G06T 7/70 |
| 2020/0134870 A1 * | 4/2020 | Ban .......................... | G06T 7/74 |
| 2020/0167951 A1 * | 5/2020 | Nachtegall ............... | G06T 7/74 |
| 2021/0197856 A1 * | 7/2021 | Hoshina ............... | B60W 40/08 |
| 2022/0026987 A1 * | 1/2022 | Hu ...................... | G06V 10/764 |
| 2022/0164987 A1 * | 5/2022 | Tao ........................ | G06T 7/337 |
| 2022/0398765 A1 * | 12/2022 | Tomatsu ............... | G06V 40/10 |
| 2023/0046840 A1 * | 2/2023 | Ramanathan ........... | G06T 7/593 |
| 2024/0042936 A1 * | 2/2024 | Germaine ................ | B60R 1/22 |
| 2024/0104942 A1 * | 3/2024 | Kumagai .............. | G06V 20/59 |
| 2024/0166153 A1 * | 5/2024 | Bohdan ................. | G06V 40/16 |
| 2024/0169590 A1 * | 5/2024 | Ishihara ............ | G02B 27/0172 |
| 2024/0212198 A1 * | 6/2024 | Hayashi ............... | G01S 13/867 |
| 2024/0233181 A1 * | 7/2024 | Fukui ................... | H04N 23/61 |
| 2024/0362931 A1 * | 10/2024 | Katz ..................... | G06V 40/20 |

* cited by examiner

OCCUPANT MONITORING DEVICE, OCCUPANT MONITORING METHOD, AND MEDIUM

TECHNICAL FIELD

The present disclosure relates to an occupant monitoring device, an occupant monitoring method, and a medium.

BACKGROUND ART

An occupant monitoring device acquires a captured image of an occupant in a vehicle, and performs image processing on the acquired captured image, thereby performing various types of sensing on the occupant. For example, Patent Literature 1 describes that a line-of-sight direction of a driver is detected using a captured image, and whether or not inattentive driving is performed is determined. Patent Literature 1 describes performing calibration in order to correct a detection error in a line-of-sight direction caused by an individual difference of a driver. Further, Patent Literature 2 describes measuring a position and a direction of an imaging unit and performing calibration according to the measured position and direction of the imaging unit.

CITATION LIST

Patent Literatures

Patent Literature 1: JP 2005-313843 A
Patent Literature 2: JP 2010-181209 A

SUMMARY OF INVENTION

Technical Problem

Here, the imaging unit is generally disposed in a steering column or a center console. However, since many devices are arranged on the steering column and the center console in addition to the imaging unit, the layout of the imaging unit is limited. Accordingly, it is conceivable to arrange the imaging unit on a movable unit such as a rearview mirror, for example, which has more room for layout than the steering column and the center console. In this case, even if calibration is performed by the method described in Patent Literature 1 or Patent Literature 2, the positional relationship between the imaging unit and an occupant changes when the occupant corrects the angle of the rearview mirror, which causes a problem that sensing performance is deteriorated.

The present disclosure has been made to solve the above-described problems, and an object thereof is to suppress deterioration in sensing performance due to a change in a position of an imaging unit in an occupant monitoring device in which the imaging unit is provided in a movable unit in a vehicle.

Solution to Problem

An occupant monitoring device according to the present disclosure includes processing circuitry configured to: acquire a captured image in which an inside of a vehicle is captured by an imaging device provided in a movable component in the vehicle; perform sensing that is at least one of state determination of an occupant or personal authentication of the occupant by image processing of the captured image; estimate whether or not there is a change in a position of the imaging device, perform calibration for the image processing; and not perform the sensing and perform the calibration when the processing circuitry estimates that there is a change in the position of the imaging device.

An occupant monitoring method according to the present disclosure includes acquiring a captured image in which an inside of a vehicle is captured by an imaging device provided in a movable component in the vehicle; performing sensing that is at least one of state determination of an occupant or personal authentication of the occupant by image processing of the captured image; estimating whether or not there is a change in a position of the imaging device; performing calibration for the image processing; and performing the calibration without performing the sensing when it is estimated that there is a change in the position of the imaging device.

As for a non-transitory computer readable medium with an executable program stored thereon, and the program instructs a computer to perform: acquiring a captured image in which an inside of a vehicle is captured by an imaging device provided in a movable component in the vehicle; performing sensing that is at least one of state determination of an occupant or personal authentication of the occupant by image processing of the captured image; estimating whether or not there is a change in a position of the imaging device; performing calibration for the image processing; and performing the calibration without performing the sensing when it is estimated that there is a change in the position of the imaging device.

Advantageous Effects of Invention

According to the present disclosure, in an occupant monitoring device in which an imaging device is provided in a movable unit in a vehicle, when it is estimated that there is a change in a position of the imaging device, sensing is not performed and calibration is performed, and thereby it is possible to suppress a decrease in sensing performance caused by the change in the position of the imaging device.

DESCRIPTION OF EMBODIMENTS

First Embodiment

Figure 1:
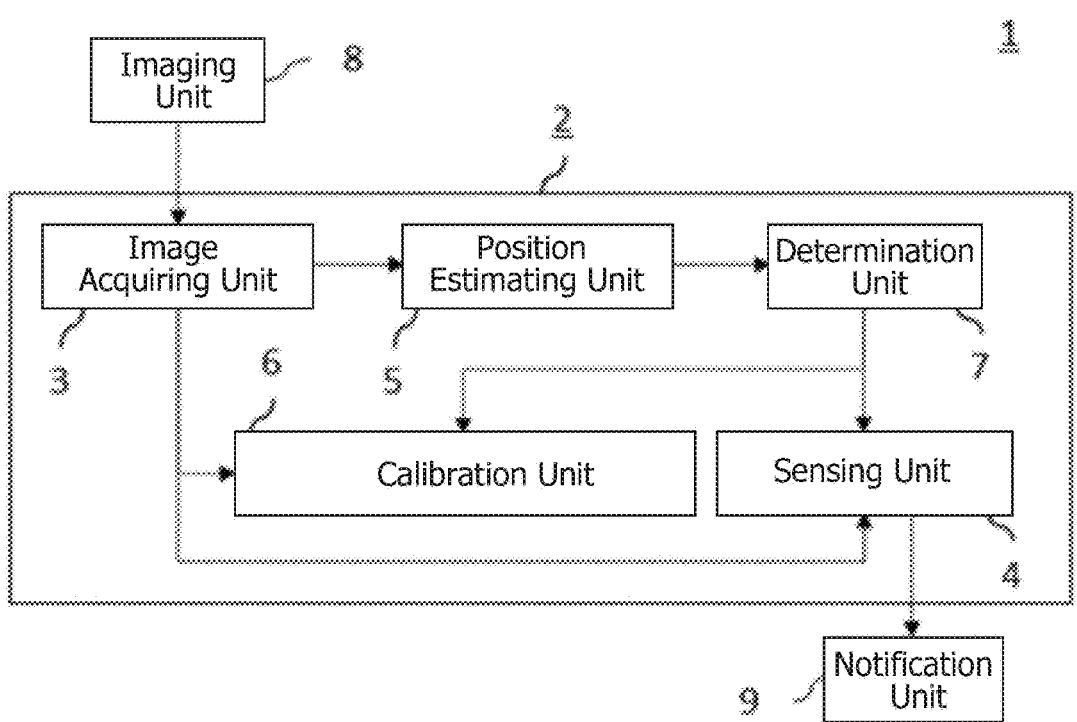
FIG. 1 is a block diagram illustrating a part of a vehicle including an occupant monitoring device according to a first embodiment.

An occupant monitoring device 2 according to a first embodiment will be described with reference to FIG. 1. FIG. 1 is a block diagram illustrating a part of a vehicle 1 including the occupant monitoring device 2 according to the first embodiment. The occupant monitoring device 2 is a driver monitoring system (DMS), and performs various sensing for an occupant in the vehicle 1 by image processing for the occupant. The vehicle 1 illustrated in FIG. 1 includes an occupant monitoring device 2, an imaging unit 8, and a notification unit 9. The occupant monitoring device 2 includes an image acquiring unit 3, a sensing unit 4, a position estimating unit 5, a calibration unit 6, and a determination unit 7. Here, the occupant is either a driver or a passenger of the vehicle 1.

The imaging unit 8 is a camera provided in a movable unit in the vehicle 1, and images the inside of the vehicle 1. The movable unit in the vehicle 1 is configured to be changeable in position or angle by an operation of an occupant or an instruction from the vehicle 1, and is, for example, a rearview mirror or a telescopic steering column. The rearview mirror is suspended from a ceiling of a front portion in the vehicle 1, and a driver can change the angle of the rearview mirror to check a rear side of the vehicle 1. The telescopic steering column is configured to be capable of changing the position of the steering wheel, and the driver can optimize the driving posture by adjusting the telescopic steering column.

The imaging unit 8 captures, from an installation position, an image of an imaging area extending at a preset angle of view of the camera. The imaging unit 8 is installed in such a manner that the face of the occupant in the vehicle I to be imaged is included in the imaging area. The imaging unit 8 captures images of an occupant in the vehicle 1 at intervals of, for example, 30 to 60 frames per second (fps), and outputs the captured images to the image acquiring unit 3.

The image acquiring unit 3 acquires a captured image from the imaging unit 8. Then, the image acquiring unit 3 outputs the acquired captured image to the position estimating unit 5, the sensing unit 4, and the calibration unit 6.

The sensing unit 4 performs sensing that is at least one of state determination of the occupant such as dozing driving and inattentive driving or personal authentication of the occupant by image processing of the captured image. The image processing of the captured image in the sensing unit 4 is, for example, detection of a face orientation, an eye opening degree, a line-of-sight direction, and the like.

The position estimating unit 5 estimates whether or not there is a change in the position of the imaging unit 8. As described above, the imaging unit 8 is provided on a movable unit such as the rearview mirror and the telescopic steering column in the vehicle 1. Accordingly, there is a possibility that the position of the imaging unit 8 is changed by angle adjustment of the rearview mirror or the telescopic steering column. Changing the position of the imaging unit 8 means that the position of at least one of a rotational direction or a translational direction of the imaging unit 8 changes as compared with calibration last time. In addition, the position estimating unit 5 may estimate that there is a change in the position of the imaging unit 8 in at least one of a case where a rotation amount of the imaging unit 8 is equal to or more than a preset first threshold of the rotation amount or a case where a translation amount of the imaging unit 8 is equal to or more than a preset first threshold of the translation amount. The first threshold of the rotation amount and the first threshold of the translation amount are each set to be larger than, for example, a change in the position of the imaging unit 8 caused by vibration of the vehicle 1 generated by traveling of the vehicle 1.

Here, the rotation amount of the imaging unit 8 is the change amount of the rotational direction of the imaging unit 8, the translation amount of the imaging unit 8 is the change amount of the translational direction of the imaging unit 8, and a change amount of the position of the imaging unit 8 is the movement amount and the rotation amount of the imaging unit 8. Further, at least one of a case where the rotation amount of the imaging unit 8 is equal to or more than the preset first threshold of the rotation amount or a case where the translation amount of the imaging unit 8 is equal to or more than the preset first threshold of the translation amount is expressed as a case where the change amount of the position of the imaging unit 8 is equal to or more than the first threshold. Then, a case where the rotation amount of the imaging unit 8 is less than the preset first threshold of the rotation and a case where the translation amount of the imaging unit 8 is less than the preset first threshold of the translation amount are expressed as a case where the change amount of the position of the imaging unit 8 is less than the first threshold.

An example of a method of estimating whether or not there is a change in the position of the imaging unit 8 by the position estimating unit 5 will be described. The position estimating unit 5 calculates a coordinate position of a preset object in the captured image. The preset object is an installed object in the vehicle 1 present in the imaging range of the imaging unit 8, and is, for example, a vehicle seat, a headrest, or a window frame. The preset object is, for example, an installed object present at a position assumed to be included in the imaging range of the imaging unit 8 even when the position of the imaging unit 8 is changed due to adjustment of the angle of the rearview mirror or the telescopic steering column by the driver, and is appropriately set depending on the installation place of the imaging unit 8. The position estimating unit 5 calculates a coordinate position of the object in the captured image, and stores the calculated coordinate position for a preset time. Then, the position estimating unit 5 compares the coordinate position of the object in a current captured image with the coordinate position of the object in a past captured image, and calculates the rotation amount and the translation amount of the imaging unit 8. Next, the position estimating unit 5 compares the calculated rotation amount and translation amount of the imaging unit 8 with a first threshold of the rotation amount and a first threshold of the translation amount, respectively. Then, when the change amount of the position of the imaging unit 8 is equal to or more than the first threshold, the position estimating unit 5 estimates that there is a change in the position of the imaging unit 8. Further, for example, according to the method described in Patent Literature 2, the position estimating unit 5 can also estimate the change amount in the imaging unit 8 using a captured image.

Furthermore, the method of estimating whether or not there is a change in the position of the imaging unit 8 by the position estimating unit 5 is not limited to the above-described method. For example, when the position of the movable unit in the vehicle 1 in which the imaging unit 8 is provided changes, the position estimating unit 5 may estimate whether or not the imaging unit 8 has moved by acquiring, from the vehicle 1, information indicating that the position of the movable unit in the vehicle 1 has changed. In addition, the position estimating unit 5 may acquire information indicating the change amount in the movable unit in the vehicle 1 from the vehicle 1, and estimate the change amount in the imaging unit 8 on the basis of the acquired information.

The calibration unit 6 performs calibration for image processing of the sensing unit 4. Calibration is processing for correcting an individual difference of an occupant who is a sensing target in image processing. In general, a sensing result by the sensing unit 4 is accompanied by a detection error due to an individual difference of the occupant. Accordingly, the calibration unit 6 performs calibration to secure sensing accuracy in the sensing unit 4. Hereinafter, a specific example of the calibration will be described, but the calibration is not limited thereto, and other known means may be used.

First, an example in which the calibration unit 6 corrects a standard model used for detection of a line-of-sight direction will be described. In this case, the sensing unit 4 holds a standard model for detection of a line-of-sight direction in which a captured image in which the face of the occupant is captured and a line-of-sight direction of the occupant are associated with each other. Then, the sensing unit 4 detects the line-of-sight direction of the occupant from the captured image using the standard model, and determines, for example, the presence or absence of inattentive driving. Here, the standard model held in the sensing unit 4 needs to be corrected in accordance with the individual difference of the occupant.

Accordingly, the calibration unit 6 corrects the standard model on the basis of the actual line-of-sight direction of the occupant and the captured image in that state. For example, the calibration unit 6 detects the line-of-sight direction of the occupant, and uses the result to estimate the vehicle equipment that the occupant is gazing at. Then, the calibration unit 6 determines the direction of the vehicle equipment viewed from the occupant as a reference of the line-of-sight direction, and corrects the standard model on the basis of an error between the line-of-sight direction as the reference and the detected line-of-sight direction. In addition, the calibration unit 6 may correct the standard model by associating the line of sight when the occupant is operating each device in the vehicle 1 with the position of the device where the operation is performed. Thus, the sensing unit 4 can accurately detect the line-of-sight direction regardless of an individual difference of the occupant.

Further, the calibration unit 6 may correct a standard model used for face direction detection. In this case, the sensing unit 4 holds a 3D model that is a standard model, detects a face direction of the occupant from a captured image using the 3D model, and determines, for example, whether or not the occupant is driving inattentively. The 3D model is, for example, a 3D model reflecting a face size and feature points of face parts of a standard adult. That is, the 3D model does not reflect a face size and the feature points of face parts of the occupant.

Accordingly, the calibration unit 6 extracts feature points corresponding to the feature points of the 3D model from the occupant in the captured image. A method of extracting feature points of the occupant from the captured image is not particularly limited, and for example, the feature points are extracted by a feature point extraction technique by machine learning, an image recognition technique such as edge extraction, or template matching. Then, the calibration unit 6 compares positions of the feature points of the 3D model with positions of the feature points of the occupant extracted from the captured image on the captured image. Next, the calibration unit 6 calibrates the positions of the feature points of the 3D model in accordance with the positions of the feature points of the occupant extracted from the captured image in such a manner that errors between the positions of the feature points of the 3D model and the positions of the feature points of the occupant extracted from the captured image are within a preset threshold. Thus, the sensing unit 4 can accurately detect the face direction regardless of the individual difference of the occupant.

In addition, the calibration unit 6 may correct the standard model used for eye opening degree detection. In this case, the sensing unit 4 holds a standard model for detecting the eye opening degree of the occupant. Then, the sensing unit 4 detects the eyes of the occupant from the captured image, and detects the eye opening degree, which is an opening degree of the eyes of the occupant, using the standard model. The standard model for eye opening degree detection includes, for example, information of a reference flatness which is a value obtained by dividing a width of an eye when the eye is open by a height of the eye, but the reference flatness varies depending on the individual difference of the occupant.

Accordingly, the calibration unit 6 calculates widths and heights of the eyes of the occupant from the captured image and calculates the reference flatness of the occupant. Then, the calibration unit 6 corrects the standard model on the basis of an error between the reference flatness of the standard model and the calculated reference flatness of the occupant. Thus, the sensing unit 4 can accurately detect the eye opening degree regardless of the individual difference of the occupant.

The determination unit 7 determines whether or not to perform each of sensing in the sensing unit 4 and calibration by the calibration unit 6 depending on an estimation result of the position estimating unit 5. More specifically, when the determination unit 7 determines that the position of the imaging unit 8 has changed using the estimation result of the position estimating unit 5, the determination unit 7 causes the calibration unit 6 to perform calibration. Then, the determination unit 7 does not cause the sensing unit 4 to perform sensing during the calibration, and restarts sensing in the sensing unit 4 after the calibration is completed. Alternatively, the determination unit 7 does not cause the sensing result in the sensing unit 4 to be output during the calibration, and may cause the sensing result in the sensing unit 4 to be output after the calibration is completed. Hereinafter, not causing sensing in the sensing unit 4 to be performed includes both not causing sensing to be performed and causing sensing to be performed but not outputting a sensing result. Detailed processing operation of the determination unit 7 will be described in an occupant monitoring method to be described later.

The notification unit 9 is, for example, a speaker or a display provided in the vehicle 1 that notifies the occupant of information. When acquiring information indicating a sensing result from the sensing unit 4, the notification unit 9 notifies the occupant of the sensing result. Further, when the notification unit 9 acquires a signal indicating that the sensing is not performed from the determination unit 7, the notification unit 9 notifies the occupant that the sensing is not performed. Furthermore, when the notification unit 9 acquires information indicating that the sensing result is not to be output from the sensing unit 4 or the determination unit 7, the notification unit 9 notifies the occupant that sensing is not performed.

Next, a hardware configuration example of the occupant monitoring device 2 will be described. FIG. 2 is a block diagram illustrating a hardware configuration example of the occupant monitoring device 2 of the first embodiment. The image acquiring unit 3, the sensing unit 4, the position estimating unit 5, the calibration unit 6, and the determination unit 7 of the occupant monitoring device 2 may be a processing circuit 12 that is dedicated hardware as illustrated in FIG. 2A, or may be a processor 13 that executes a program stored in a memory 14 as illustrated in FIG. 2B.

Figure 2A:
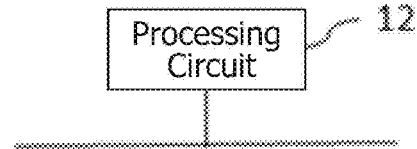
FIGS. 2A and 2B are block diagrams illustrating a hardware configuration example of the occupant monitoring device according to the first embodiment.

As illustrated in FIG. 2A, in a case where the image acquiring unit 3, the sensing unit 4, the position estimating unit 5, the calibration unit 6, and the determination unit 7 are dedicated hardware, the processing circuit 12 corresponds to, for example, a single circuit, a composite circuit, a programmed processor, a parallel-programmed processor, an application specific integrated circuit (ASIC), a field-programmable gate array (FPGA), or a combination thereof. Each of the functions of the image acquiring unit 3, the sensing unit 4, the position estimating unit 5, the calibration unit 6, and the determination unit 7 may be implemented by a processing circuit, or the functions of the respective units may be collectively implemented by one processing circuit.

Figure 2B:
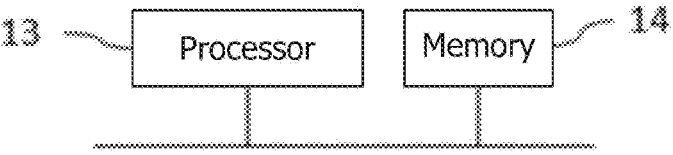

As illustrated in FIG. 2B, in a case where the image acquiring unit 3, the sensing unit 4, the position estimating unit 5, the calibration unit 6, and the determination unit 7 are the processor 13, the functions of the respective units are implemented by software, firmware, or a combination of software and firmware. Software or firmware is described as a program and stored in the memory 14. The processor 13 reads and executes a program stored in the memory 14 to implement each function of the image acquiring unit 3, the sensing unit 4, the position estimating unit 5, the calibration unit 6, and the determination unit 7. That is, the image acquiring unit 3, the sensing unit 4, the position estimating unit 5, the calibration unit 6, and the determination unit 7 include the memory 14 for storing a program that results in execution of each step illustrated in FIG. 3, FIG. 5, FIG. 6, or FIG. 8 described later when executed by the processor 13. In addition, it can also be said that these programs cause a computer to execute procedures or methods of the image acquiring unit 3, the sensing unit 4, the position estimating unit 5, the calibration unit 6, and the determination unit 7.

Here, the processor 13 is, for example, a central processing unit (CPU), a processing device, an arithmetic device, a processor, a microprocessor, a microcomputer, a digital signal processor (DSP), or the like. The memory 14 may be, for example, a nonvolatile or volatile semiconductor memory such as a random access memory (RAM), a read only memory (ROM), a flash memory, an erasable programmable ROM (EPROM), or an electrically EPROM (EEPROM), a magnetic disk such as a hard disk or a flexible disk, or an optical disk such as a mini disk, a compact disc (CD), or a digital versatile disc (DVD).

Note that a part of each of the functions of the image acquiring unit 3, the sensing unit 4, the position estimating unit 5, the calibration unit 6, and the determination unit 7 may be implemented by dedicated hardware, and a part thereof may be implemented by software or firmware. As described above, the processing circuit 12 in the occupant monitoring device 2 can implement the above-described functions by hardware, software, firmware, or a combination thereof.

Figure 3:
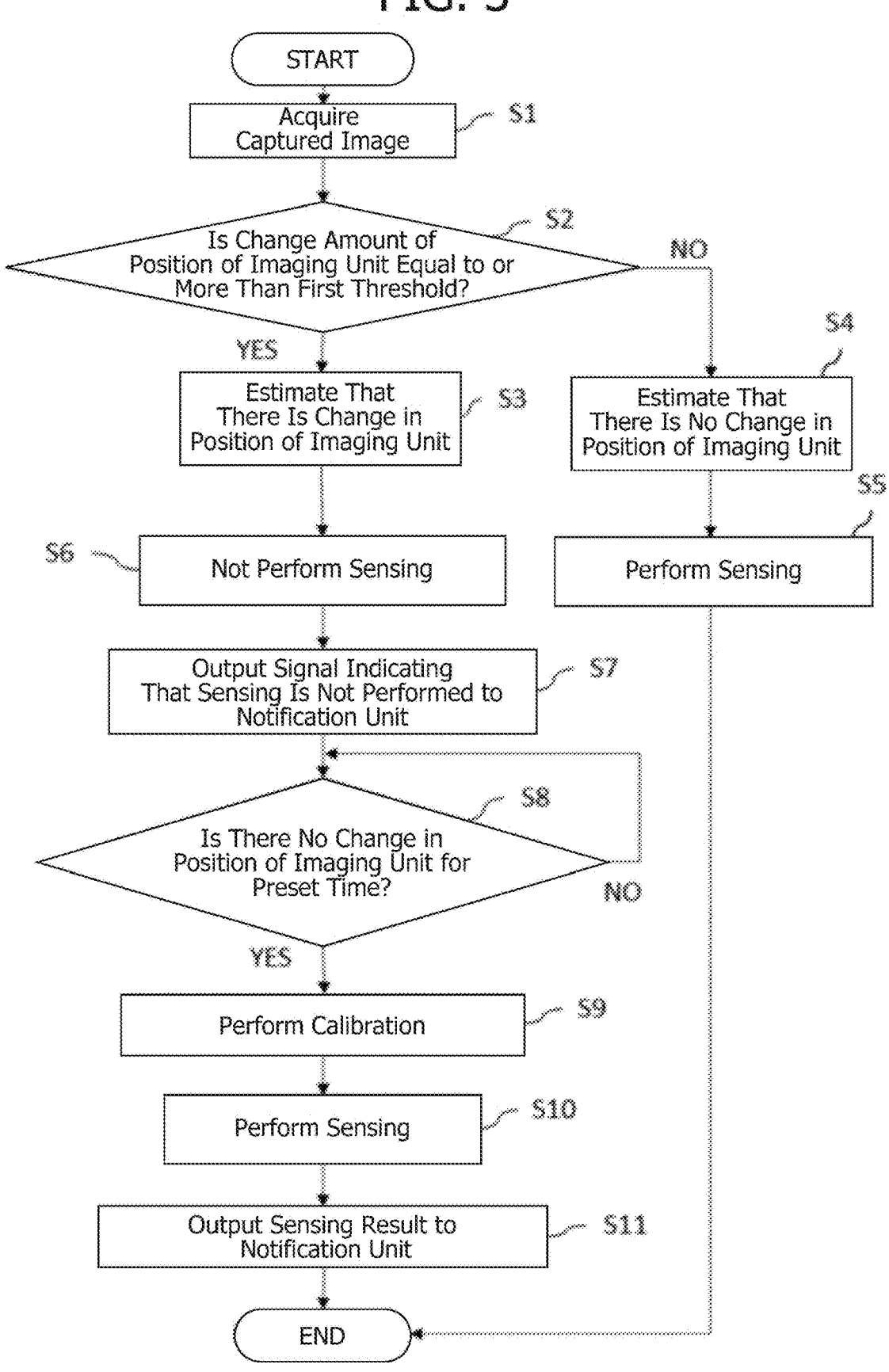
FIG. 3 is a flowchart illustrating processing operation of the occupant monitoring device according to the first embodiment.

Next, an occupant monitoring method by the occupant monitoring device 2 will be described. FIG. 3 is a flowchart illustrating a processing operation of the occupant monitoring device 2 of the first embodiment. The occupant monitoring device 2 starts operation, for example, at a timing when the imaging unit 8 starts activation, and repeats operation while the vehicle 1 is traveling. In the following description, it is assumed that the sensing unit 4 performs sensing at START in FIG. 3.

In step S1, the image acquiring unit 3 acquires a captured image from the imaging unit 8. Then, the image acquiring unit 3 outputs the acquired captured image to the position estimating unit 5, the sensing unit 4, and the calibration unit 6.

In step S2, the position estimating unit 5 determines whether or not the change amount of the position of the imaging unit 8 is equal to or more than the first threshold. Then, when the change amount of the position of the imaging unit 8 is equal to or more than the first threshold (YES in step S2), the position estimating unit 5 estimates that there is a change in the position of the imaging unit 8 (step S3). When the change amount of the position of the imaging unit 8 is less than the first threshold (NO in step S2), the position estimating unit 5 estimates that there is no change in the position of the imaging unit 8 (step S4).

When the position estimating unit 5 estimates that there is no change in the position of the imaging unit 8 (step S4), the determination unit 7 determines to cause the sensing by the sensing unit 4 to be performed (step S5). That is, the determination unit 7 causes the sensing by the sensing unit 4 to continue.

When the position estimating unit 5 estimates that there is a change in the position of the imaging unit 8 (step S3), the determination unit 7 determines not to cause the sensing by the sensing unit 4 to be performed (step S6). That is, the determination unit 7 causes the sensing by the sensing unit 4 to stop.

In step S7, the determination unit 7 outputs a signal indicating that sensing is not performed to the notification unit 9. Thus, the notification unit 9 notifies the occupant that the sensing is not performed. Step S7 may be performed simultaneously with step S6. In addition, the notification unit 9 may continuously notify the occupant that the sensing is not performed until a processing operation in step S10 described later.

In step S8, the determination unit 7 determines whether or not the position estimating unit 5 estimates that there is no change in the position of the imaging unit 8 for a preset time. When the position estimating unit 5 does not estimate that there is no change in the position of the imaging unit 8 for the preset time (NO in step S8), the determination unit 7 repeats step S8 until the position estimating unit 5 estimates that there is no change in the position of the imaging unit 8 for the preset time. The preset time is set to, for example, a time necessary for the position or angle of the movable unit in the vehicle 1 to be changed by an operation of an occupant or an instruction of the vehicle 1. The preset time is, for example, 30 seconds.

When the position estimating unit 5 estimates that there is no change in the position of the imaging unit 8 for the preset time (YES in step S8), the determination unit 7 causes the calibration by the calibration unit 6 to be performed (step S9).

After the calibration by the calibration unit 6 is completed, the determination unit 7 causes sensing by the sensing unit 4 to be performed in step S10.

In step S11, the sensing unit 4 outputs the sensing result to the notification unit 9. Thus, the notification unit 9 notifies the occupant of the sensing result.

Thus, the processing operation of the occupant monitoring device 2 is ended.

Next, effects of the occupant monitoring device 2 of the present first embodiment will be described in comparison with a conventional occupant monitoring device. The conventional occupant monitoring device performs image processing on a captured image captured by the imaging unit 8 installed in a fixed portion in the vehicle 1 such as a steering column or a center console, and performs sensing for an occupant. Then, the conventional occupant monitoring device performs calibration, for example, when a preset time has elapsed. In the conventional occupant monitoring device, since the imaging unit 8 is installed in the fixed portion in the vehicle 1, the position of the imaging unit 8 does not easily change, and thus it is possible to maintain the sensing performance by performing calibration in a case where a preset time has elapsed. However, since many devices other than the imaging unit 8 are arranged in the fixed portion in the vehicle 1 such as the steering column and the center console, the layout of the imaging unit 8 is limited.

In general, the movable unit in the vehicle 1 has more room in layout than the fixed portion. Accordingly, the occupant monitoring device 2 of the present embodiment performs image processing on a captured image captured by the imaging unit 8 provided in a movable unit in the vehicle 1 such as a rearview mirror and a telescopic steering column, and performs sensing for the occupant. Here, in the occupant monitoring device 2 of the present embodiment, a case will be considered in which calibration is performed when a preset time has elapsed similarly to the conventional occupant monitoring device. In this case, for example, even if the angle of the movable unit provided with the imaging unit 8 is changed and the positional relationship between the imaging unit 8 and the occupant changes, the occupant monitoring device 2 continues sensing without performing calibration until a preset time elapses. Thus, there is a problem that a state in which the sensing performance is deteriorated is continued.

Accordingly, the occupant monitoring device 2 of the present embodiment includes the image acquiring unit 3 to acquire a captured image in which the inside of the vehicle 1 is captured by the imaging unit 8 provided in a movable unit in the vehicle 1, the sensing unit 4 to perform sensing that is at least one of state determination of an occupant or personal authentication of the occupant by image processing of the captured image, the position estimating unit 5 to estimate whether or not there is a change in a position of the imaging unit 8, the calibration unit 6 to perform calibration for the image processing in the sensing unit 4, and the determination unit 7 not to cause the sensing by the sensing unit 4 to be performed and to cause the calibration by the calibration unit 6 to be performed when the position estimating unit 5 estimates that there is a change in the position of the imaging unit 8. Thus, since the occupant monitoring device 2 of the present embodiment performs the calibration when it is estimated that there is a change in the position of the imaging unit 8, it is possible to suppress deterioration in sensing performance due to the change in the position of the imaging unit 8.

In addition, when the position estimating unit 5 estimates that the position of the imaging unit 8 does not change continuously for a preset time, the determination unit 7 causes the calibration unit 6 to perform the calibration. The preset time is a time necessary for changing the position or angle of the movable unit in the vehicle 1 by, for example, an operation of an occupant or an instruction of the vehicle 1. Thus, the determination unit 7 does not cause calibration to be performed while the position of the imaging unit 8 changes, so that the processing load can be reduced. Note that it is not necessary to perform the processing operation in step S8 illustrated in FIG. 3. That is, when the position estimating unit 5 estimates that there is a change in the position of the imaging unit 8, the determination unit 7 may cause the calibration by the calibration unit 6 to be performed.

Further, when the position estimating unit 5 estimates that there is a change in the position of the imaging unit 8, the determination unit 7 causes the sensing by the sensing unit 4 to be performed after the calibration by the calibration unit 6 ends. Thus, sensing can be quickly restarted after completion of calibration.

Further, when not causing the sensing by the sensing unit 4 to be performed, the determination unit 7 outputs a signal indicating that the sensing is not performed to the notification unit 9 that notifies the occupant of information. Thus, it is possible to notify the occupant that sensing is not performed in the occupant monitoring device 2.

In addition, vibration is generated in the entire vehicle 1 when the vehicle 1 travels, and thus the position of the imaging unit 8 changes strictly while the vehicle 1 travels. Accordingly, when accuracy of the position estimating unit 5 is high enough to detect a change in the position of the imaging unit 8 due to the vibration of the vehicle 1, the occupant monitoring device 2 repeatedly performs step S8 in FIG. 3. Alternatively, when step S8 of FIG. 3 is not performed, the occupant monitoring device 2 repeatedly performs step S9. Thus, a period during which sensing by the sensing unit 4 is not performed becomes long.

Accordingly, the position estimating unit 5 estimates that there is a change in the position of the imaging unit 8 in at least one of a case where the rotation amount of the imaging unit 8 is equal to or more than a preset first threshold of the rotation amount or a case where the translation amount of the imaging unit 8 is equal to or more than a preset first threshold of the translation amount. The first threshold of the rotation amount and the first threshold of the translation amount are each larger than, for example, a change in the position of the imaging unit 8 caused by vibration of the vehicle I generated by traveling of the vehicle 1. Thus, the occupant monitoring device 2 can suppress deterioration in sensing performance due to a change in the position of the movable unit in the vehicle 1. Note that a change in the position of the imaging unit 8 caused by vibration of the vehicle 1 generated by traveling of the vehicle 1 is smaller than a change in the position of the imaging unit 8 due to a change in the position of the movable unit in the vehicle 1. Accordingly, a decrease in sensing performance due to vibration of the vehicle 1 caused by traveling of the vehicle 1 is smaller than a decrease in sensing performance due to a change in the position of the movable unit in the vehicle 1.

Second Embodiment

Figure 4:
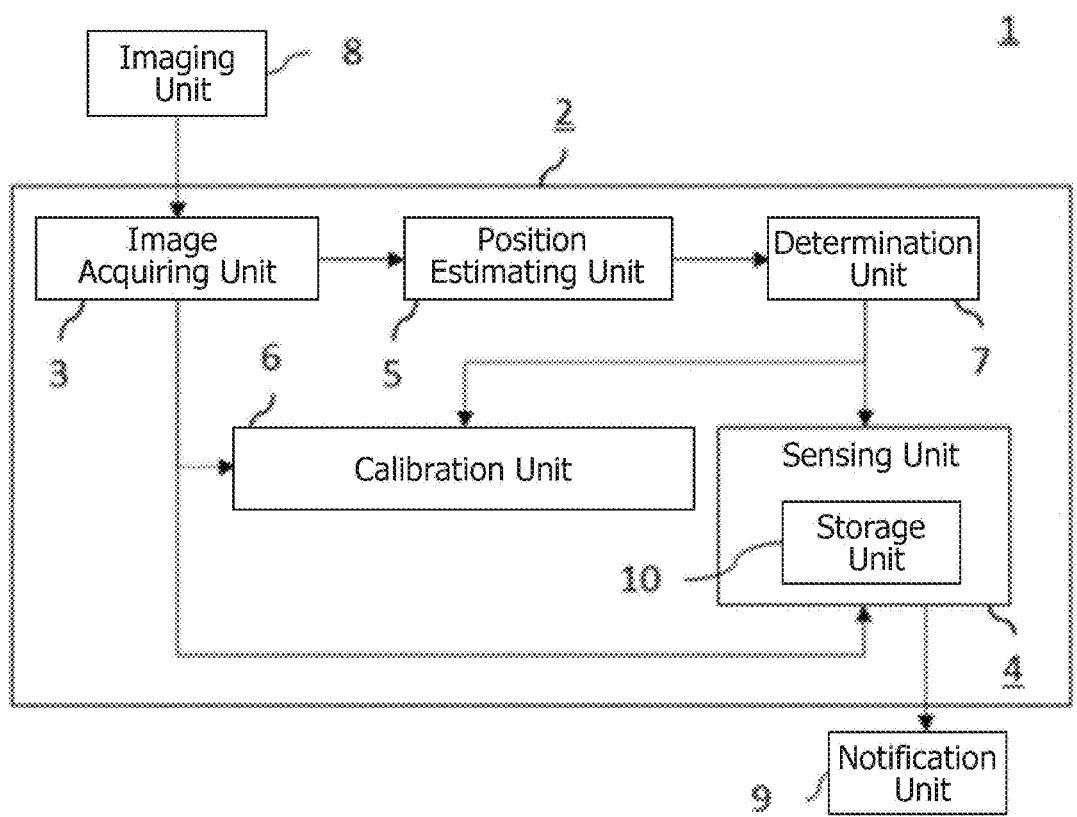
FIG. 4 is a block diagram illustrating a part of a vehicle including an occupant monitoring device according to a second embodiment.

An occupant monitoring device 2 according to a second embodiment will be described with reference to FIG. 4. FIG. 4 is a block diagram illustrating a part of the vehicle 1 including the occupant monitoring device 2 according to the second embodiment. In the occupant monitoring device 2 of the second embodiment, the sensing unit 4 includes a storage unit 10. Other configurations of the occupant monitoring device 2 are similar to those of the first embodiment. The same reference numerals are given to configurations similar to those of the first embodiment.

As in the first embodiment, the sensing unit 4 performs sensing that is at least one of state determination of an occupant such as dozing driving and inattentive driving or personal authentication of the occupant by image processing of the captured image. Then, the sensing unit 4 includes the storage unit 10.

The storage unit 10 stores at least a result of sensing last time. Then, in accordance with a signal from the determination unit 7, a result of sensing last time is output to the notification unit 9. Note that the storage unit 10 may be provided in the occupant monitoring device 2 separately from the sensing unit 4.

Figure 5:
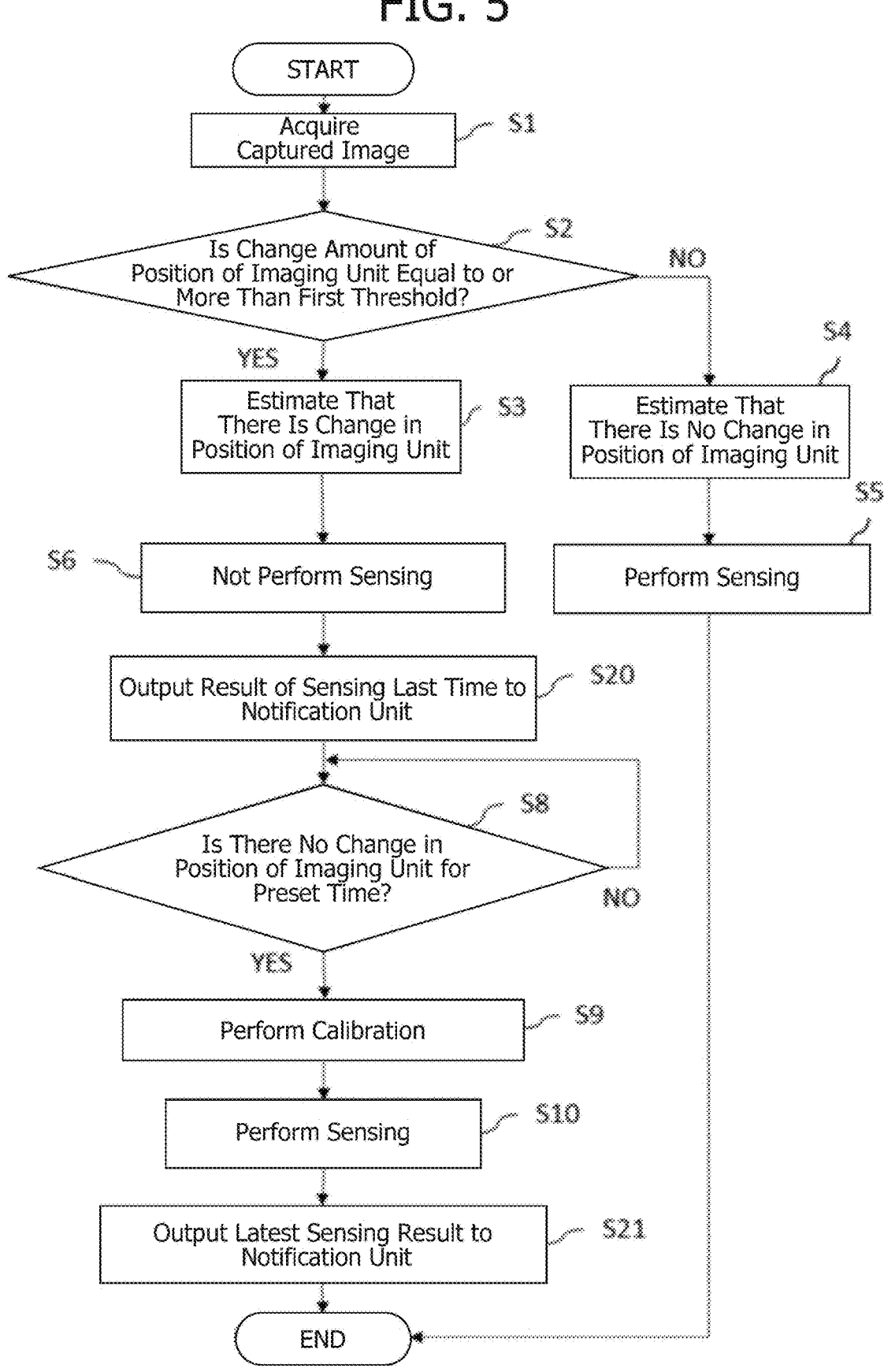
FIG. 5 is a flowchart illustrating processing operation of the occupant monitoring device according to the second embodiment.

Next, an occupant monitoring method by the occupant monitoring device 2 will be described. FIG. 5 is a flowchart illustrating processing operation of the occupant monitoring device 2 according to the second embodiment. The occupant monitoring device 2 starts operation, for example, at a timing when the imaging unit 8 starts activation, and repeats operation while the vehicle 1 is traveling. In the following description, it is assumed that the sensing unit 4 performs sensing at START in FIG. 5.

Steps S1 to S6 and steps S8 to S10 are similar to the processing operation of the occupant monitoring device 2 of the first embodiment illustrated in FIG. 3. When the position estimating unit 5 estimates that there is a change in the position of the imaging unit 8 (step S3), the determination unit 7 determines not to cause the sensing by the sensing unit 4 to be performed (step S6), and the process proceeds to step S20. In addition, in step S6, in a case where the sensing unit 4 performs sensing but does not output a result of sensing, the sensing unit 4 does not store the result of sensing in the storage unit 10 as valid data.

In step S20, the determination unit 7 causes the sensing unit 4 to output the result of the sensing last time to the notification unit 9. Thus, the notification unit 9 notifies the occupant of the result of the sensing in the sensing unit 4 before the position of the imaging unit 8 is estimated to have changed. Step S20 may be performed simultaneously with step S6. In addition, the notification unit 9 may continuously notify the occupant of the result of the sensing in the sensing unit 4 before the position of the imaging unit 8 is estimated to have changed until the processing operation in step S21 to be described later. Next, the occupant monitoring device 2 performs processing operations of steps S8 to S10.

In step S21, the determination unit 7 causes the sensing unit 4 to output the latest result of the sensing to the notification unit 9.

Thus, the processing operation of the occupant monitoring device 2 is ended.

As in the first embodiment, the occupant monitoring device 2 of the present embodiment includes the image acquiring unit 3 to acquire a captured image captured by the imaging unit 8 provided in a movable unit in the vehicle 1, the sensing unit 4 to perform sensing that is at least one of state determination of an occupant or personal authentication of the occupant by image processing of the captured image, the position estimating unit 5 to estimate whether or not there is a change in a position of the imaging unit 8, the calibration unit 6 to perform calibration for the image processing in the sensing unit 4, and the determination unit 7 not to cause the sensing by the sensing unit 4 to be performed and to cause the calibration by the calibration unit 6 to be performed when the position estimating unit 5 estimates that there is a change in the position of the imaging unit 8. Thus, it is possible to suppress deterioration in sensing performance due to a change in the position of the imaging unit 8.

In addition, while the position of the imaging unit 8 is changing and during the calibration, there is a high possibility that the sensing unit 4 cannot ensure the sensing accuracy and erroneously detects the same. Accordingly, the sensing unit 4 stores at least a result of the sensing last time, and when not causing the sensing by the sensing unit 4 to be performed, the determination unit 7 causes the sensing unit 4 to output the result of the sensing last time to the notification unit 9. Thus, the occupant monitoring device 2 outputs the result of the sensing of the sensing unit 4 before the position of the imaging unit 8 changes while the position of the imaging unit 8 is changing and during the calibration execution, and thus it is possible to suppress erroneous detection by the sensing unit 4.

Third Embodiment

Figure 6:
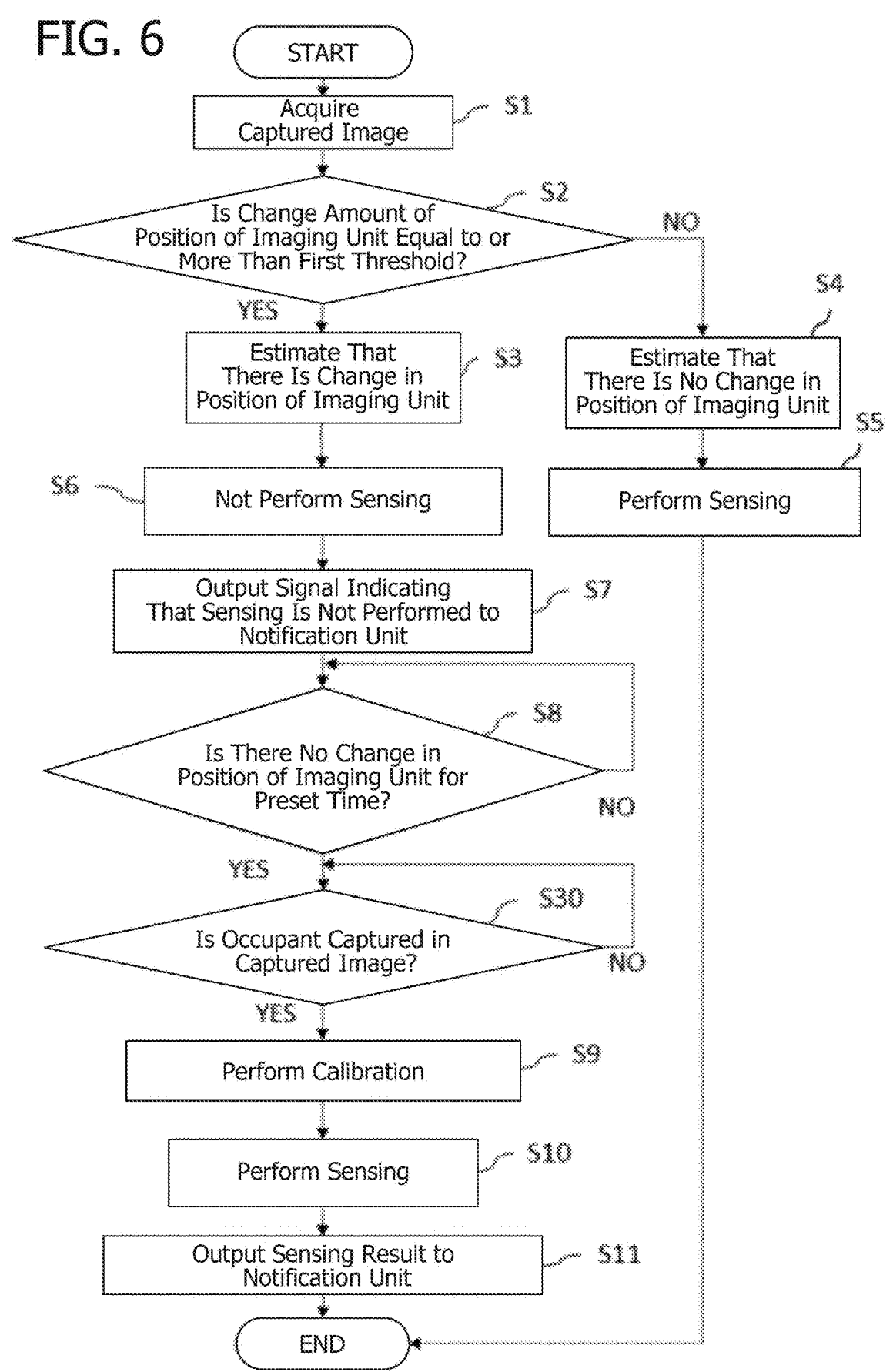
FIG. 6 is a flowchart illustrating processing operation of an occupant monitoring device according to a third embodiment.

An occupant monitoring device 2 according to a third embodiment will be described with reference to FIG. 6. FIG. 6 is a flowchart illustrating processing operation of the occupant monitoring device 2 according to the third embodiment. The occupant monitoring device 2 of the third embodiment is different from the occupant monitoring devices 2 of the first and second embodiments in the processing operation of the determination unit 7. Other configurations of the occupant monitoring device 2 are similar to those of the first embodiment or the second embodiment. The same reference numerals are given to configurations similar to those of the first embodiment.

Steps S1 to S8 are similar to the processing operation of the occupant monitoring device 2 of the first embodiment illustrated in FIG. 3. In the occupant monitoring device 2 of the first embodiment, when the position estimating unit 5 estimates that there is no change in the position of the imaging unit 8 for the preset time (YES in step S8), the determination unit 7 causes the calibration by the calibration unit 6 to be performed (step S9).

On the other hand, in the occupant monitoring device 2 of the present embodiment, when the position estimating unit 5 estimates that there is no change in the position of the imaging unit 8 for the preset time (YES in step S8), the determination unit 7 determines whether or not the occupant who is a target of the sensing by the sensing unit 4 is captured in the captured image (step S30). The determination unit 7 may cause, for example, the sensing unit 4 or the calibration unit 6 to determine whether or not the occupant who is a target of the sensing by the sensing unit 4 is captured in the captured image.

When the determination unit 7 determines that the occupant is captured in the captured image (YES in step S30), the process proceeds to step S9. Steps S9 to S11 are similar to the processing operation of the occupant monitoring device 2 of the first embodiment illustrated in FIG. 3.

When the determination unit 7 determines that the occupant is not captured in the captured image (NO in step S30), the determination unit 7 repeats step S30 until it is determined that the occupant is captured in the captured image. That is, the determination unit 7 does not cause calibration (step S9) and sensing (step S10) to be performed in a case where the occupant is not captured in the captured image.

Thus, the processing operation of the occupant monitoring device 2 is ended.

As in the first embodiment, the occupant monitoring device 2 of the present embodiment includes the image acquiring unit 3 to acquire a captured image in which the inside of the vehicle 1 is captured by the imaging unit 8 provided in a movable unit in the vehicle 1, the sensing unit 4 to perform sensing that is at least one of state determination of an occupant or personal authentication of the occupant by image processing of the captured image, the position estimating unit 5 to estimate whether or not there is a change in a position of the imaging unit 8, the calibration unit 6 to perform calibration for the image processing in the sensing unit 4, and the determination unit 7 not to cause the sensing by the sensing unit 4 to be performed and to cause the calibration by the calibration unit 6 to be performed when the position estimating unit 5 estimates that there is a change in the position of the imaging unit 8. Thus, it is possible to suppress deterioration in sensing performance due to a change in the position of the imaging unit 8.

In addition, in a case where the occupant is not captured by the imaging unit 8, the calibration unit 6 and the sensing unit 4 cannot perform calibration and sensing, respectively. Accordingly, the determination unit 7 does not cause the calibration and the sensing to be performed in a case where the occupant is not captured in the captured image, so that unnecessary processing can be suppressed.

Fourth Embodiment

Figure 7:
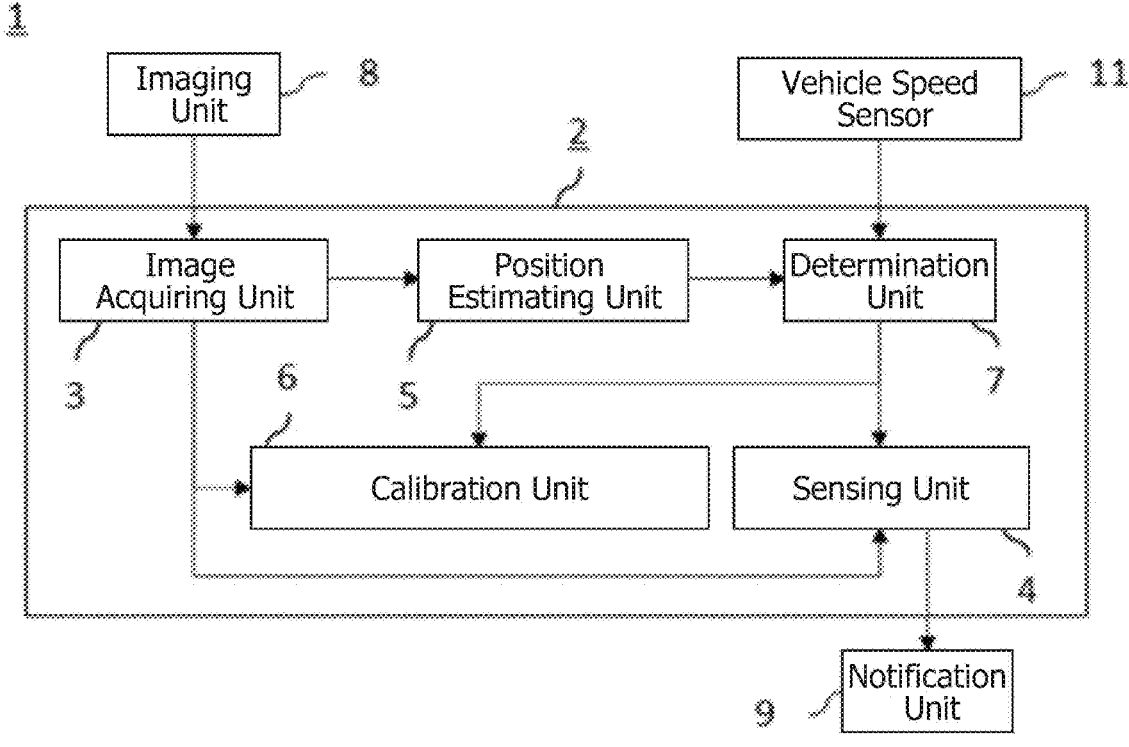
FIG. 7 is a block diagram illustrating a part of a vehicle including an occupant monitoring device according to a fourth embodiment.

An occupant monitoring device 2 according to a fourth embodiment will be described. FIG. 7 is a block diagram illustrating a part of the vehicle 1 including the occupant monitoring device 2 according to the fourth embodiment. The vehicle 1 according to the fourth embodiment includes a vehicle speed sensor 11 that detects a speed of the vehicle 1.

As described above, the occupant monitoring device 2 performs sensing that is at least one of state determination of an occupant such as dozing driving and inattentive driving or personal authentication of the occupant by the sensing unit 4. Thus, the occupant monitoring device 2 can improve safety and comfort of the occupant.

On the other hand, when the position of the movable unit provided with the imaging unit 8 is changed, the positional relationship between the imaging unit 8 and the occupant is changed, and thus, the possibility that the sensing unit 4 performs erroneous detection is increased, and the safety and comfort of the occupant are deteriorated. Accordingly, when it is estimated that there is a change in the position of the imaging unit 8, the occupant monitoring device 2 according to the first to third embodiments does not cause the sensing by the sensing unit 4 to be performed but causes the calibration by the calibration unit 6 to be performed, and thus it is possible to suppress a decrease in sensing accuracy.

Incidentally, the possibility that the sensing unit 4 performs erroneous detection differs depending on the change amount of the position of the imaging unit 8. That is, the sensing accuracy decreases as the change amount of the position of the imaging unit 8 increases. The occupant monitoring device 2 according to the fourth embodiment is different from the occupant monitoring devices 2 according to the first to third embodiments in that the position estimating unit 5 estimates a change amount of a position of the imaging unit 8, and the determination unit 7 performs determination depending on the change amount of the position of the imaging unit 8. Other configurations of the occupant monitoring device 2 are similar to those of any one of the first to third embodiments. The same reference numerals are given to configurations similar to those of the first embodiment.

Similarly to the first embodiment, the position estimating unit 5 estimates that there is a change in the position of the imaging unit 8 in a case where the change amount of the position of the imaging unit 8 is equal to or more than the first threshold.

The determination unit 7 determines whether or not the rotation amount of the imaging unit 8 is equal to or larger than a second threshold of a preset rotation amount, and whether or not the translation amount of the imaging unit 8 is equal to or larger than a second threshold of a preset translation amount. The second threshold of the rotation amount and the second threshold of the translation amount are set to values larger than the first threshold of the rotation amount and the first threshold of the translation amount, respectively. The second threshold of the rotation amount and the second threshold of the translation amount are appropriately set according to how much the sensing accuracy by the sensing unit 4 is desired to be secured. For example, the second threshold of the rotation amount and the second threshold of the translation amount are each set to the change amount of the position of the imaging unit 8 in which a change amount of the position of the imaging unit 8 and a probability of erroneous detection by the sensing unit 4 are experimentally calculated, and a possibility of erroneous detection of sensing by the sensing unit 4 is 80%.

Hereinafter, at least one of a case where the rotation amount of the imaging unit 8 is equal to or more than the second threshold of the preset rotation amount or a case where the translation amount of the imaging unit 8 is equal to or more than the second threshold of the preset translation amount will be expressed as a case where the change amount of the position of the imaging unit 8 is equal to or more than the second threshold. Further, a case where the rotation amount of the imaging unit 8 is less than the second threshold of the preset rotation amount or a case where the translation amount of the imaging unit 8 is less than the second threshold of the preset translation amount are expressed as a case where the change amount of the position of the imaging unit 8 is less than the second threshold.

Then, in a case where the position estimating unit 5 estimates that the change amount of the position of the imaging unit 8 is equal to or more than the first threshold and there is a change in the position of the imaging unit 8, the determination unit 7 performs the following determination. When determining that the change amount of the position of the imaging unit 8 is less than the second threshold, the determination unit 7 causes the sensing by the sensing unit 4 to be performed and does not cause the calibration by the calibration unit 6 to be performed, for example, until the vehicle 1 stops. Further, when determining that the change amount of the position of the imaging unit 8 is equal to or more than the second threshold, the determination unit 7 does not cause the sensing by the sensing unit 4 to be performed and causes the calibration to be performed regardless of the traveling state of the vehicle 1.

Figure 8:
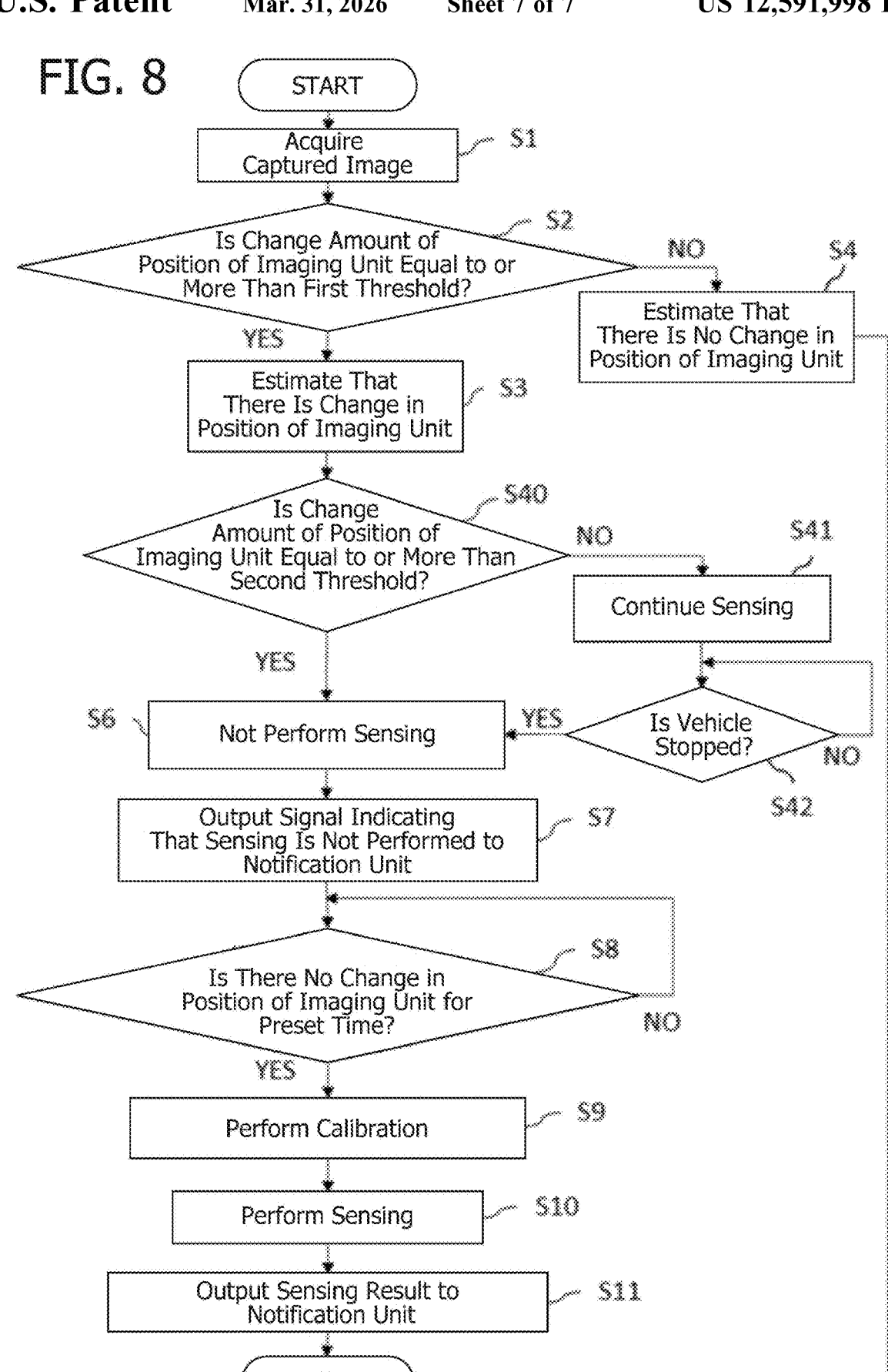
FIG. 8 is a flowchart illustrating processing operation of the occupant monitoring device according to the fourth embodiment.

Next, an occupant monitoring method by the occupant monitoring device 2 will be described. FIG. 8 is a flowchart illustrating processing operation of the occupant monitoring device 2 according to the fourth embodiment. The occupant monitoring device 2 starts operation, for example, at a timing when the imaging unit 8 starts activation, and repeats operation while the vehicle 1 is traveling. In the following description, it is assumed that the sensing unit 4 performs sensing at START in FIG. 8.

Steps S1 to S4 are similar to the processing operation of the occupant monitoring device 2 of the first embodiment illustrated in FIG. 3. When the position estimating unit 5 estimates that there is a change in the position of the imaging unit 8 (step S3), the determination unit 7 determines whether or not the change amount of the position of the imaging unit 8 is equal to or more than the second threshold (step S40).

When the change amount of the position of the imaging unit 8 is equal to or more than the second threshold (YES in step S40), the process proceeds to step S6. When the change amount of the position of the imaging unit 8 is less than the second threshold (NO in step S40), the determination unit 7 causes the sensing by the sensing unit 4 to continue (step S41). Then, the determination unit 7 acquires information indicating the speed of the vehicle 1 from the vehicle speed sensor 11, and determines whether or not the vehicle 1 is stopped (step S42). When the vehicle 1 is stopped (YES in step S42), the process proceeds to step S5. When the vehicle 1 is not stopped (NO in step S42), step S42 is repeated. That is, when the vehicle 1 is not stopped (NO in step S42), the sensing is continued until the vehicle 1 stops. Steps S6 to S11 are similar to the processing operation of the occupant monitoring device 2 of the first embodiment illustrated in FIG. 3.

Thus, the processing operation of the occupant monitoring device 2 is ended.

As in the first embodiment, the occupant monitoring device 2 of the present embodiment includes the image acquiring unit 3 to acquire a captured image in which the inside of the vehicle 1 is captured by the imaging unit 8 provided in a movable unit in the vehicle 1, the sensing unit 4 to perform sensing that is at least one of state determination of an occupant or personal authentication of the occupant by image processing of the captured image, the position estimating unit 5 to estimate whether or not there is a change in a position of the imaging unit 8, the calibration unit 6 to perform calibration for the image processing in the sensing unit 4, and the determination unit 7 not to cause the sensing by the sensing unit 4 to be performed and to cause the calibration by the calibration unit 6 to be performed when the position estimating unit 5 estimates that there is a change in the position of the imaging unit 8. Thus, it is possible to suppress deterioration in sensing performance due to a change in the position of the imaging unit 8.

Further, in the occupant monitoring device 2 according to the present embodiment, in a case where the rotation amount of the imaging unit 8 is less than the second threshold of the preset rotation amount, and in a case where the translation amount of the imaging unit 8 is less than the second threshold of the preset translation amount, that is, in a case where the change amount of the position of the imaging unit 8 is equal to or more than the first threshold and less than the second threshold, the determination unit 7 causes the sensing by the sensing unit 4 to be performed and does not cause the calibration by the calibration unit 6 to be performed until the vehicle 1 stops. After the vehicle 1 stops, the determination unit 7 does not cause the sensing by the sensing unit 4 to be performed, and causes the calibration by the calibration unit 6 to be performed. The second threshold may be appropriately set depending on how much the sensing accuracy by the sensing unit 4 is desired to be secured. For example, a case is considered in which the change amount of the position of the imaging unit 8 and the probability of erroneous detection by the sensing unit 4 are experimentally calculated, and the second threshold is set to the change amount of the position of the imaging unit 8 in which the possibility of erroneous detection of sensing by the sensing unit 4 is 80%.

In this case, when the possibility of erroneous detection of sensing is less than 80%, the determination unit 7 determines that the sensing accuracy has been secured, and causes the sensing to continue until the vehicle 1 stops. Thus, the occupant monitoring device 2 can improve safety and comfort of the occupant by performing sensing while the vehicle 1 is traveling.

Further, when the possibility of erroneous detection of sensing is equal to or more than 80%, the determination unit 7 determines that the sensing accuracy cannot be secured, and causes the calibration to be performed regardless of the traveling state of the vehicle 1. In this manner, in a case where the sensing accuracy cannot be secured, priority can be given to improving the sensing accuracy.

Note that, in the present embodiment, the example has been described in which the determination unit 7 acquires the information indicating the speed of the vehicle 1 from the vehicle speed sensor 11 and determines whether or not the vehicle 1 is stopped, but the present invention is not limited thereto. For example, the determination unit 7 may acquire information indicating an open/closed state of a door and on/off of an ignition switch from the vehicle 1 and determine whether or not the vehicle 1 is stopped.

In addition, each embodiment disclosed in the present specification can be freely combined within the scope thereof, and each embodiment can be appropriately modified or omitted.

REFERENCE SIGNS LIST

1: vehicle, 2: occupant monitoring device, 3: image acquiring unit, 4: sensing unit, 5: position estimating unit, 6: calibration unit, 7: determination unit, 8: imaging unit, 9: notification unit, 10: storage unit, 11: vehicle speed sensor, 12: processing circuit, 13: processor, 14: memory

The invention claimed is:

1. An occupant monitoring device comprising:
processing circuitry configured to
acquire a captured image in which an inside of a vehicle
   is captured by an imaging device provided in a movable
   component in the vehicle;
perform sensing that is at least one of state determination
   of an occupant or personal authentication of the occu-
   pant by image processing of the captured image;
estimate whether or not there is a change in a position of
   the imaging device;
perform calibration for the image processing; and
not perform the sensing and perform the calibration when
   the processing circuitry estimates that there is a change
   in the position of the imaging device, wherein
when the processing circuitry estimates that the position
   of the imaging device does not change continuously for
   a preset time, the processing circuitry performs the
   calibration, and
the preset time corresponds to a time necessary for a
   position or an angle of the movable component to be
   changed by an operation of the occupant or an instruc-
   tion of the vehicle.

2. The occupant monitoring device according to claim 1, wherein when the processing circuitry estimates that there is a change in the position of the imaging device, the processing circuitry perform the sensing after completion of the calibration.

3. The occupant monitoring device according to claim 1, wherein when the sensing is not performed, the processing circuitry outputs a signal indicating that the sensing is not performed to notify the occupant of information.

4. The occupant monitoring device according to claim 1, wherein the processing circuitry stores at least a result of the sensing last time, and when the sensing is not performed, the processing circuitry outputs the result of the sensing last time to notify the occupant of information.

5. The occupant monitoring device according to claim 1, wherein when the occupant is not captured in the captured image, the processing circuitry does not perform the calibration and the sensing.

6. The occupant monitoring device according to claim 1, wherein the processing circuitry estimates that there is a change in the position of the imaging device in at least one of a case where a rotation amount of the imaging device is equal to or more than a preset first threshold of the rotation amount or a case where a translation amount of the imaging device is equal to or more than a preset first threshold of the translation amount.

7. The occupant monitoring device according to claim 6, wherein each of the first threshold of the rotation amount and the first threshold of the translation amount is greater than a change in the position of the imaging device caused by vibration of the vehicle generated by traveling of the vehicle.

8. The occupant monitoring device according to claim 6, wherein in a case where the rotation amount of the imaging device is less than a second threshold of a preset rotation amount and in a case where the translation amount of the imaging device is less than a second threshold of a preset translation amount, the processing circuitry performs the sensing and does not perform the calibration until the vehicle stops, and does not perform the sensing and perform the calibration after the vehicle stops, and in at least one of a case where the rotation amount of the imaging device is equal to or more than the second threshold of the rotation amount or a case where the translation amount of the imaging device is equal to or more than the second threshold of the translation amount, the processing circuitry does not perform the sensing and perform the calibration.

9. An occupant monitoring method comprising:

acquiring a captured image in which an inside of a vehicle is captured by an imaging device provided in a movable component in the vehicle;

performing sensing that is at least one of state determination of an occupant or personal authentication of the occupant by image processing of the captured image;

estimating whether or not there is a change in a position of the imaging device;

performing calibration for the image processing; and performing the calibration without performing the sensing when it is estimated that there is a change in the position of the imaging device, wherein the occupant monitoring method further comprises:

when estimating that the position of the imaging device does not change continuously for a preset time, performing the calibration, and the preset time corresponds to a time necessary for a position or an angle of the movable component to be changed by an operation of the occupant or an instruction of the vehicle.

10. A non-transitory computer readable medium with an executable program stored thereon, wherein the program instructs a computer to perform:

acquiring a captured image in which an inside of a vehicle is captured by an imaging device provided in a movable component in the vehicle;

performing sensing that is at least one of state determination of an occupant or personal authentication of the occupant by image processing of the captured image;

estimating whether or not there is a change in a position of the imaging device;

performing calibration for the image processing; and performing the calibration without performing the sensing when it is estimated that there is a change in the position of the imaging device, wherein the program instructs the computer to further perform:

when estimating that the position of the imaging device does not change continuously for a preset time, performing the calibration, and the preset time corresponds to a time necessary for a position or an angle of the movable component to be changed by an operation of the occupant or an instruction of the vehicle.

\* \* \* \* \*